United States Patent [19]

Paton et al.

[11] 4,095,594
[45] Jun. 20, 1978

[54] METHOD OF MANUFACTURING LAMINATED SHELLS

[75] Inventors: Boris Evgenievich Paton; Simon Lvovich Mandelberg; Semen Mikhailovich Biletsky; Vyacheslav Anastasievich Atamanchuk, all of Kiev; Zakhar Osipovich Knyazhinsky, Dnepropetrovsk; Yakov Efimovich Osada, Moscow; Julian Vasilievich Kotenzhi, Khartsyzsk Donetskoi oblasti, all of U.S.S.R.

[73] Assignee: Institut Electrosvarki Imeni E.O. Patona Akademii Nauk Ukrainskoi SSR, Kiev, U.S.S.R.

[21] Appl. No.: 768,772

[22] Filed: Feb. 15, 1977

[51] Int. Cl.² .................................. B23K 31/02
[52] U.S. Cl. ............................ 228/143; 228/184
[58] Field of Search ........................ 228/143, 184

[56] References Cited

U.S. PATENT DOCUMENTS

| 2,767,740 | 10/1956 | Fentress | 228/143 X |
| 3,528,162 | 9/1970 | Sagara | 228/143 X |
| 3,704,509 | 12/1972 | Yamauchi | 228/184 |
| 3,755,883 | 9/1973 | Shimizu | 228/143 |
| 3,774,296 | 11/1973 | Clay | 228/184 |
| 3,871,313 | 3/1975 | Yamauchi | 228/184 X |

FOREIGN PATENT DOCUMENTS

| 464,051 | 1/1971 | Japan | 228/143 |
| 477,603 | 3/1972 | Japan | 228/143 |
| 281,690 | 12/1970 | U.S.S.R. | 228/143 |

Primary Examiner—Donald G. Kelly
Attorney, Agent, or Firm—Fleit & Jacobson

[57] ABSTRACT

A method of manufacturing laminated shells for high pressure vessels and pipes comprising wrapping a metal sheet into a coil, welding the sheet end edges adjoining coil layers and joining adjacent layers by welding, wherein, with a view to increasing the process efficiency and providing for a tighter wrapping of the sheet and a higher structional strength adjacent; layers are joined together upon completion of coil wrapping by fusing at least three layers nearest to the overlapping layer along a line equidistant from the sheet end edge.

3 Claims, 2 Drawing Figures

METHOD OF MANUFACTURING LAMINATED SHELLS

The present invention relates to processes of production laminated shells, and can be used in the manufacture of laminated shells, pipes, high pressure vessels and drums.

Known in the art is a method of manufacturing laminated pipes by wrapping sheet metal into a coil with subsequent welding of the sheet front and end edges to adjacent layers (cf. British Pat. No. 900,664 and USSR Inventor's Certificate No. 71,464).

The application and pressure testing of pipes fabricated according to this method show that a pipe failure occurs, as a rule, in the layer adjoining the overlapping one near the sheet end edge. This is caused by uneven distribution of strains over the sheet length. Nonuniformity in the strains is due to the fact that the frictional forces between the outer layers in the pipe are considerably smaller than those between the inner layers, which is way they are deformed practically together, whereas the outer ones are deformed separately. Besides, near the overlapping weld, wherein the cross-sectional area receiving a tangential load changes twofold, there arises a field of increased tangential stress concentration, which leads to necking and rupture of the layer.

The above factor substantially reduces the structural strength of the pipe and makes it necessary to increase the number of sheet layers in the coil to ensure sufficient strength, which means consuming more material.

Attempts have been made to increase the strength of laminated shells and to reduce the consumption of materials in the fabrication thereof. Specifically, the US Pat. No. 3,871,313 discloses a method of manufacturing laminated cylinders wherein an increase in strength is achieved with the aid of a circumferential weld in the shell, said weld going all the way across the wall.

No doubt, the circumferential weld in the shell wall increases the structural strength of the product, however, this technique is not suitable in the fabrication of long articles, such as pipes. This is because in the critical section, i.e. in the overlapping layer, the circumferential weld receives the tangential load only on its cross sectional area. Hence, a sufficient strength can be achieved with the aid of a large number of circumferential welds. Naturally, a large number of circumferential welds will reduce the longitudinal strength of the shell walls.

So far, the best solution of the problem, i.e. ensuring a sufficiently high strength of a shell both longitudinally and tangentially, is provided in Japanese Pat. No. 47-7603, which discloses a method of fabrication of a high pressure cylinder in accordance with this method, cylinder shells are manufactured by wrapping a thin sheet into a coil with subsequent welding of edges directly to the adjoining coil layers. Besides, as the sheet is being coiled, all the adjacent layers thereof are interconnected by successively welding each following wrap to the preceding one.

This method, along with its indisputable advantages, still suffers from certain limitations. Specifically, the welding operations to be performed after winding each wrap impair the process efficiency. Besides, in the production of such critical items as the shells of high pressure vessels and pipes which require highly reliable joints, each completed weld, must be checked by one of the known flaw detection methods (e.g. ultrasonic, X-ray, etc.). Obviously, the need to conduct repeated tests in the process of coil winding also affects the process efficiency and substantially limits the application of this method in the line production of such articles as large-diameter pipes.

And, finally, a large number of welds between the shell layers prevents tight winding of the coil, which results in a poor distribution of internal stresses in the sheet material.

It is an object of the present invention to obviate the above disadvantages and to provide a method of manufacturing laminated shells, ensuring higher efficiency without impairing the strength of the article.

Another object of the invention is to simplify the quality control of the welds in the article.

Still another object of the invention is to increase the tightness of sheet winding, thereby improving the quality of the shell.

These and other objects are attained by that in a method of manufacturing laminated shells comprising formation of a shell by winding sheet metal into a multilayer coil, making welds for securing the sheet edges to adjacent coil layers and welding adjacent layers together, in accordance with the invention, adjacent layers are joined together, upon completion of sheet winding with at least three top layers being fused along a line equidistant from the edge of the overlapping end of the sheet.

An advantage of the new method as compared with the prior art ones consists in that fusing the top layers in a single pass after winding the sheet provides for continuity of the process, enables its efficiency to be increased a number of times, and ensures adequate structural strength of the article, since the fusion weld is formed in the critical section of the sheet. The higher process efficiency is also due to the fact that a single quality control operation at the end of the process is sufficient. Besides, the proposed technique provides for sufficiently tight wrapping of the sheet, which in previous methods was hindered because of a large number of welds between the layers. This and other factors contribute to a more uniform distribution of internal stresses in the sheet material and enhance the structural strength of the articles.

The above objects are also attained by that the fusion is performed directly along the edge of the sheet end, simultaneously securing said end by an overlapping weld. This enables the operations of joining adjacent layers and securing the sheet end to be combined, which also contributes to higher process efficiency.

It is most expedient to carry out fusion and overlapping welding in a common weld puddle by two arcs spaced apart, one of which is a shielded arc and the other is a submerged arc. This technique has proved to provide for the best quality of the manufactured articles.

The method in accordance with the invention will now be explained in greater detail with reference to preferred embodiments thereof, taken in conjunction with the accompanying drawings wherein.

Figure 1:
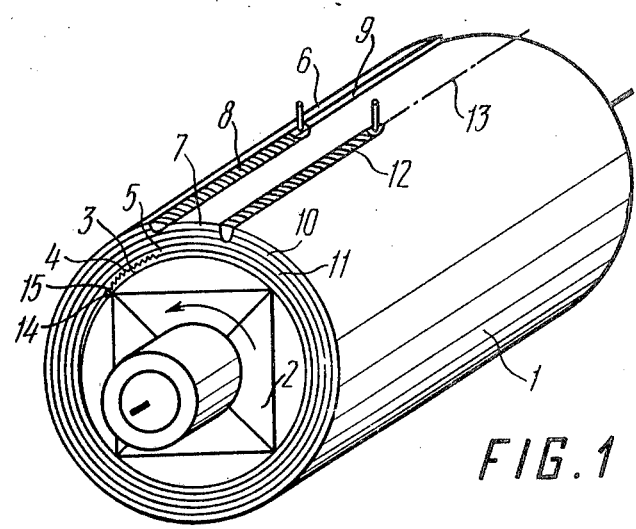
FIG. 1 is a schematic representation of carrying out the method of manufacturing laminated shells for high pressure vessels and pipes in accordance with the invention.

Referring now to FIG. 1, the semi-product of a shell is a laminated coil 1, which is formed of a thin steel sheet wound over a driving drum 2. An inner end 3 of the coil 1 is joined, along the sheet edges, by a weld 4 to an adjacent inner layer 5 of the coil 1.

A second overlapping end 6 of the coil 1 is joined to an adjacent outer layer 7 of the coil 1 by a weld 8, formed along the edge thereof. Layers 7, 10 and 11 are joined together by a weld 12 formed along a line 13 equidistant from the edge 9 of the overlapping end 6 of the coil 1.

The above-described product is obtained by the proposed method as follows.

In accordance with the invention, the method of manufacturing laminated shells includes the following steps: formation of the shell by winding sheet metal into the multilayer coil 1, securing one end 3 of the sheet to the adjacent inner layer 5 of the coil 1, joining the adjacent layers 7, 10 and 11 of the coil 1, and securing the other, laminated and 6 to the adjacent top layer 7 of the coil 1. The shell is formed on a rotary drum 2, which is put into rotary motion and supplied with the first end 3 of a thin steel sheet which is the initial blank. After one and a half wraps have been made the rotary motion of the drum and the sheet winding are stopped. The end 3 is secured to the adjacent inner layer 5 of the coil 1, thereby forming a weld 4 on the abutting edge.

Then, the drum 2 is put into rotary motion again and a necessary number of layers of thin steel sheet are wound over the contour formed by the inner layer 5. When the winding is over, the drum is stopped and the overlapping end 6 is joined to the adjacent outer layer 7 of the coil 1. The overlapping end 6 is joined along the edge 9 thereof by weld 8.

The outer layers 7, 9 and 10 of the coil 1 closer to the overlapping end 6 are penetrated and fused together, forming a weld 11 along the line 12 equidistant to the edge 9.

The sequence of operations namely, securing of the overlapping end 6 of the coil 1 and fusing of the layers 7, 9 and 10, may be changed without affecting the main advantage of the proposed method, i.e. lower labor intensity in joining layers and higher efficiency of the process as compared with the prior art methods. In particular after the winding of the coil has been completed, the layers 7, 10 and 11 may be fused first, and only then the weld 8 joining the overlapping end 6 to the layer 7 may be formed, which does not affect in the least the labour intensity and the time necessary for fusing.

After the above operations are over, the coil is taken off the drum 2, the first end 3 of the sheet is welded to the adjacent inner layer 5, thereby forming a weld 14 along an edge 15.

Similarly, housings pipes and similar product can be manufactured.

Figure 2:
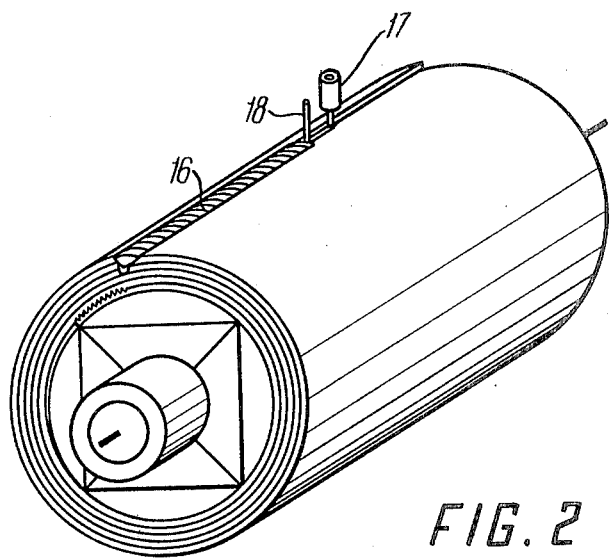
FIG. 2 shows an embodiment wherein the layers are fused simultaneously with joining the end of the sheet by an overlapping weld according to the invention.

In accordance with another embodiment of the invention, the coil 1 is wound and one end 3 of the sheet is joined to the adjacent inner layer 5 in the same way as described above, while the fusion of the top layers 7, 10 and 11 is accomplished along the edge 9 of the sheet end 6 simultaneously joining said end by an overlapping weld 16, as shown in FIG. 2. In accordance with this embodiment of the invention, the fusion and formation of the overlapping weld 16 are accomplished in a commmon weld puddle by two spaced arcs 17 and 18 simultaneously moved along the edge 9 of the end 6 of the sheet. The arc 17 is inert-gas (e.g.argon) shielded, while the overlapping weld 16 is formed by submerged arc 18.

The invention is not limited to the abovedisclosed embodiments thereof and departures may be made therefrom within the spirit and scope of the invention as defined in the claims below.

The advantage of the method in accordance with the invention as compared with the prior art methods consists in that, fusion of the top layers in a single pass after the sheet has been wrapped provides for continuity of sheet winding into a coil and enables both increasing the efficiency a number of times and ensuring adequate structural strength of the article, since the fusion weld is formed in the critical section of the sheet. An increase in efficiency is also due to the fact that a single quality control operation at the end of the process is sufficient. Besides, the proposed technique provides for sufficiently tight wrapping of the coil, which in previous methods was hindered because of a large number of welds between the layers. This factor improve the structural strength of the products.

Simultaneous joining of adjacent layers of the coil and the sheet end also enables the efficiency of the process to be increased. The above operations are best accomplished if the fusion and overlapping welding are carried out in a common weld puddle by two arcs spaced apart, one of which is a shielded arc and the other is a submerged arc.

What is claimed is:

1. A method of manufacturing laminated shells for high pressure vessels and pipes, including:
    forming a shell from a sheet by wrapping it into a laminated coil having a plurality of layers; forming welds joining an inner end of said sheet to an adjacent inner layer of said coil;
    forming a weld joining an outer end of said sheet to an adjacent outer layer of said coil; and,
    joining together at least three outer layers of said coil by penetrating said layers along a line equidistant from the edge of the outer end of the sheet.

2. A method as claimed in claim 1, wherein said penetrating of said layers is carried out along the outer end of said sheet simultaneously with said forming of the weld joining the outer end of said sheet to the adjacent outer layer of said coil.

3. A method as claimed in claim 2, wherein said penetrating of said layers and said forming of the weld are carried out in a common weld puddle by two arcs spaced apart, one arc being a shielded arc and the other being a submerged arc.

* * * * *